May 5, 1931.                A. S. WELLS                1,803,579
TIP PLATE FOR A TOOTH
Filed March 31, 1926
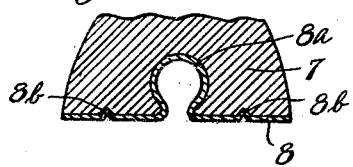
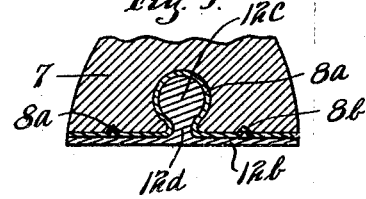
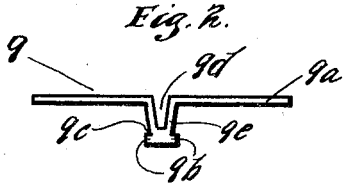
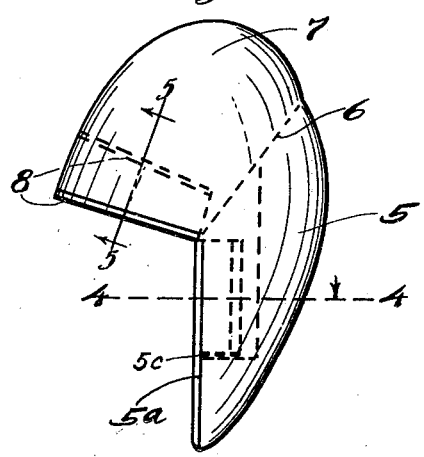
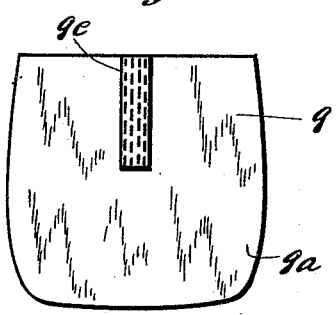
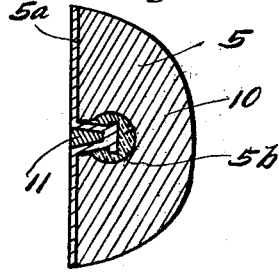
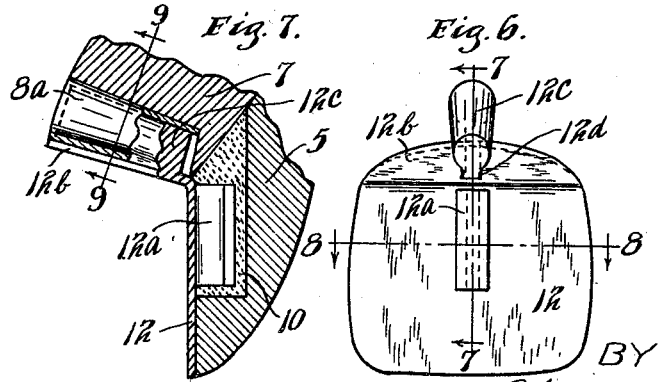
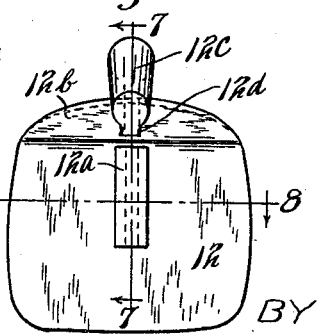
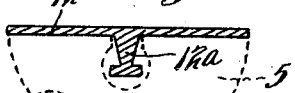
INVENTOR
AMOS S. WELLS.
BY HIS ATTORNEYS Patented May 5, 1931

1,803,579

UNITED STATES PATENT OFFICE

AMOS S. WELLS, OF MINNEAPOLIS, MINNESOTA

TIP PLATE FOR A TOOTH

Application filed March 31, 1926. Serial No. 98,918.

This invention relates to a backing for an artificial tooth. It is now one practice in dentistry to use an artificial tooth or tooth facing, usually made from porcelain, and to build a tip thereon to fit the tooth cavity of the patient. After the tip has been built on the facing and baked thereon, so as to be hardened, the backing is placed on the tooth facing and either forms the attaching means for the tooth or has the attaching or carrying plate or arm for the tooth secured thereto. The teeth facings are now commercially made and sold and include various forms, one of which has a recess in its rear flat surface, said recess comprising an enlarged inner portion and a reduced portion or passage leading to said surface.

It is an object of this invention to provide a backing for a tooth, having means adapted to enter the recess therein and be secured in said recess.

It is another object of the invention to provide a backing for an artificial tooth, which tooth has a recess therein with an enlarged inner portion comprising a plate and a locking means projecting from the plate, which locking means is adapted to enter the recess and has a shoulder formed thereon facing said plate, whereby a hardening material can be placed in said recess around said locking means and the latter be secured in place.

It is a further object of the invention to provide a backing for an artificial tooth, which tooth has a rear flat surface and a recess extending therein from said surface with an enlarged inner portion comprising a plate having a substantially T-shaped head projecting therefrom, adapted to enter said recess and be moved therein by a movement substantially perpendicular to said surface, the stem portion of said T-shaped head flaring towards said plate and substantially fitting the outer side of said recess.

It is also an object of this invention to provide a novel and efficient base member for the tip of an artificial tooth.

It is still another object of the invention to provide a backing for a tooth having a surface adapted to contact the rear flat surface of a tooth facing and preferably having means for entering the recess therein, together with a surface adapted to engage the bottom of the tip and preferably having means engaging and locking the tip or tip base in position.

These and other objects and advantages of the invention will be fully set forth in the following description made in connection with the accompanying drawings, in which like reference characters refer to similar parts throughout the several views and in which:—

Fig. 1 is a view in front elevation of the backing;

Fig. 2 is a top edge view of the backing;

Fig. 3 is a view in side elevation of a tooth with a tip built thereon, showing the backing in place therein;

Fig. 4 is a horizontal section taken on line 4—4 of Fig. 3, as indicated by the arrow;

Fig. 5 is a vertical section taken on line 5—5 of Fig. 3, as indicated by the arrow;

Fig. 6 is a front view of a modified form of backing used;

Fig. 7 is a vertical section taken substantially on line 7—7 of Fig. 6, also showing a tooth to which the backing is applied in vertical section;

Fig. 8 is a horizontal section taken on line 8—8 of Fig. 6 as indicated by the arrows; and Fig. 9 is a section taken on line 9—9 of Fig. 7, as indicated by the arrows.

Referring to the drawings, particularly Figs. 1 to 5, an artificial tooth or tooth facing 5 is shown, such as now commercially made and sold. This tooth facing has an upper flat surface indicated by the dotted line 6 and on this surface the tip 7 is built, adapted to fit into the tooth cavity of the patient. Said tip 7 is shown as having a form or base plate 8 therein. The facing 5 has a rear flat surface 5a and a recess extending into the tooth or facing from this surface, which recess has an inner enlarged portion 5b. While said enlarged portion may be made of various shapes, in the embodiment of the invention illustrated it is shown as substantially circular in cross section. A passage 5c extends from the portion 5b to the surface 5a, which passage is of reduced size or of less transverse dimension than the portion 5b. The backing for the tooth comprises a member 9 which is made from a thin metal plate, usually platinum or palladium. The member 9 has a flat platelike portion 9a adapted to fit against the surface 5a of a tooth facing, which portion 9a has an outline substantially the same as said tooth facing 5. Said portion 9a has projecting at its top and centrally thereof, a locking member or means 9e. Portion 9e has flanges 9b projecting at each side at its inner end, which form the shoulders 9c, facing toward the portion 9a. It will be noted that the sides of the portion 9e diverge toward the portion 9a. In the embodiment of the invention illustrated, the sides of the portion 9e are spaced, thus leaving a recess 9d therebetween. It will be noted that the locking means 9e is in effect T-shaped, with the stem of the T flaring toward the plate 9a.

In operation the member 9 will be placed against the surface 5a of the tooth facing 5 and the member 9e will enter the recess 5b. The member 9e is so arranged that the outer surface of its sides, adjacent the plate 9a, substantially engages the sides of the passage 5c and it may be stated that the transverse dimension of said member 9e at its inner end through the flanges 9b is substantially the same as the width of said member 9e adjacent the plate 9a. Before the backing is placed against the tooth 5, a plastic material which is adapted to harden, such as cement, is placed within the recess 5b. When the locking member 9e enters said recess, said material or cement shown as 10 will surround the inner portion of member 9e and will engage and abut against the shoulders 9c. When this material hardens, therefore, it will be seen that portion 9e will be secured or locked within the recess 5b. The recess 9d will also be filled with cement 11, if desired.

Referring to Figures 6 to 9 inclusive, a modified form of backing is shown comprising a plate 12 having projecting from the front side thereof a rib 12a, which rib 12a has a head at its outer side substantially T-shaped and is shaped in cross section substantially like the rib 9e shown on the backing 9, except that the rib 12a is shown solid instead of formed by a folded plate. It is one practice, when the tip 7 is formed on the tooth, to have the tip 7 as shown in Fig. 3 provided with the base plate 8. This plate 8 is sometimes left permanently on the tip and is sometimes removed before the tooth is finished, and the backing applied to the tooth. If the base 8 is to be removed it is made of very thin plate usually of about 1/1000th of an inch in thickness. If the base is to remain permanently on the tip it is usually made of about 12/1000ths of an inch in thickness. The base 8 as shown in Figs. 5 and 9 comprises a plate having flat side portions and means thereon extending into the tip and adapted to engage with a backing for the tip. While such means may take various forms, in the embodiment of the invention illustrated it is shown as comprising a tapered rib 8a extending longitudinally of base 8 and tapered toward the end adjacent the tooth facing. As illustrated, the rib 8a is of greater dimension at its upper end and has a reduced portion or neck adjacent the plate portion of base 8, said rib also being shown as being hollow and having a substantially frusto-conical recess therein having a reduced passage extending therefrom at its lower side. The base 8 is also provided with small upstanding ribs 8b extending longitudinally thereof at each side of the central rib 8a. The backing 12 has a plate portion 12b extending at an angle thereto, which angle is the same as the angle between the rear surface 5a of the tooth facing 5 and the bottom flat surface of the tip 7. The portion 12b of the backing 12 has means thereon adapted to engage and interfit with the base of the tip and while such means might be made in various forms, in the embodiment of the invention illustrated it is shown as comprising a rib 12c of general frusto-conical shape and having a reduced portion 12d extending from its lower side and uniting it with the plate portion 12b.

In operation after the tip has been built up and baked with the tooth facing so as to form a completed tip and facing, the backing 12 will be applied to the tooth. The backing will be applied by sliding the rib 12c into the channel in the rib 8a of the tip. If the base 8 is left permanently on the tip, the rib 12c is made to fit the openings in the rib 8a and the front surface of the plate 12 contacts the rear surface of the tooth facing 5. The rib 12a enters the recess in the facing and the cement 10 is placed about the rib 12a as already described with the backing 9, so that the rib 12a is secured and locked very firmly to the tooth facing 5. The rib 12c as stated interlocks with the rib 8a and the tip is thus also additionally attached to the backing. If the base 8 of the tip is removed the rib 12 will fit into the channel left in the tip when the plate is removed and this channel will be made so as to fit the rib 12c. With such a backing as shown in Figs. 6, 7 and 8, therefore, both the facing and the tip are secured to the backing and a very strong structure is produced. The backing 12 as stated carries the members used to attach the tooth to other sound teeth of the patient. It will be noted that as the backing 12 is moved into position the rib 12a enters the recess in facing 5 from the rear and through the reduced passage extending into the recess. It may be stated that heretofore it has been necessary to have a securing member on the tip, which tip was made separate from the facing and the securing member would thus move into the channel and the tooth facing from one end thereof and not from the rear. With applicant's construction the rib 12a is arranged so that it can move into the recess in the tooth facing in a direction substantially perpendicular to the rear flat surface of the tooth facing.

From the above description it will be seen that applicant has provided a very simple and efficient backing for a tooth and securing means therefor. The backing and locking means as stated can be placed on the tooth by being moved substantially normal to the surface 5a, and the locking means thus does not have to enter the recess 5d and channel 5c from one end thereof. After the backing is in place and the material 10 hardens, the same is firmly and permanently secured in position. The device is extremely simple and may be easily and inexpensively made and manipulated.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:

1. A backing for an artificial tooth, which tooth has a recess therein with a passage leading therefrom of less dimension than said recess, comprising a member, and means projecting from said member adapted to enter said recess through said passage, having a laterally extending flange at each side at its inner end, the width of said means across said flanges being slightly less than the width of said passage, whereby a hardening material may be placed in said recess and said means will be locked therein.

2. A backing for an artificial tooth which tooth has a flat surface and a recess therein with a passage of reduced size leading therefrom, comprising a member adapted to fit against said surface and carrying a projection adapted to enter said recess, said projection having an enlarged portion at its inner end having a width slightly less than the width of said passage, and a reduced portion adjacent said enlarged portion flaring outwardly from said enlarged portion and substantially fitting said passage at the outer side thereof.

3. A backing for an artificial tooth, which tooth has a surface with a recess therein with a passage of reduced size leading therefrom, comprising a member adapted to fit against said tooth and having a T-shaped head projecting into said recess and having a width slightly less than the width of said passage and adapted to enter the same through said passage in a direction at right angles to said surface.

4. The structure set forth in claim 3, the stem portion of said T-shaped head flaring outwardly towards said member and substantially filling said passage at its outer edge.

5. A backing for an artificial tooth, which tooth has a recess therein, with a passage leading therefrom of less dimension than said recess, comprising a backing member and a rigid means projecting from said member adapted to enter said recess through said passage, said means having a base portion extending along said member throughout its length having a width substantially the same as the width of said passage, said means having a projection forming a shoulder facing towards said backing member.

6. A backing for an artificial tooth, which tooth has a flat surface and a recess therein with a reduced passage leading from said recess to said surface comprising a backing member having a locking means thereon with an enlargement at its inner end projecting at either side thereof and having a surface facing said flat surface, said enlargement having a transverse dimension slightly less than the transverse dimension of said passage and adapted to be received in said recess and be moved thereinto through said passage in a direction substantially perpendicular to said surface to position it in its locking position.

7. A base for a tip of an artificial tooth comprising a plate of substantially the width of said tip having a flat surface over which said tip is built, said plate having a rib extending longitudinally thereof having an enlarged head and said plate having projections extending from said surface at the sides of and spaced from said rib and embedded in said tip.

8. A base for a tip of an artificial tooth comprising a member having a surface on which the tip is built of substantially the width of said tip, said member having means formed thereon and rigid therewith embedded in the body of said tip and adapted to interlock with the backing of a tooth.

9. An artificial tooth comprising a facing having a recess therein with a passage leading therefrom of less dimension than said recess; a backing, means projecting from said backing adapted to enter said recess through said passage of less dimension, said means having a laterally extending portion at each side at its inner end, the width of said means across said portions being slightly less than the width of said passage.

In testimony whereof I affix my signature.

AMOS S. WELLS.